United States Patent
Sartori et al.

(10) Patent No.: US 12,114,308 B2
(45) Date of Patent: Oct. 8, 2024

(54) SYSTEM AND METHOD FOR COMMON CONTROL CHANNELS IN A COMMUNICATIONS SYSTEM

(71) Applicant: Futurewei Technologies, Inc., Plano, TX (US)

(72) Inventors: Philippe Sartori, Naperville, IL (US); Jianghua Liu, Shenzhen (CN); Qiang Wu, Beijing (CN); Vipul Desai, Palatine, IL (US); Weimin Xiao, Hoffman Estates, IL (US); Brian Classon, Palatine, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 264 days.

(21) Appl. No.: 17/493,634

(22) Filed: Oct. 4, 2021

(65) Prior Publication Data
US 2022/0030581 A1    Jan. 27, 2022

Related U.S. Application Data

(63) Continuation of application No. 15/464,070, filed on Mar. 20, 2017, now Pat. No. 11,140,661, which is a
(Continued)

(51) Int. Cl.
*H04W 72/04* (2023.01)
*H04L 5/00* (2006.01)
(Continued)

(52) U.S. Cl.
CPC ........... *H04W 72/20* (2023.01); *H04L 5/0053* (2013.01); *H04L 5/0091* (2013.01); *H04W 24/02* (2013.01);
(Continued)

(58) Field of Classification Search
CPC . H04W 72/20; H04W 24/02; H04W 74/0833; H04W 72/02; H04L 5/0053; H04L 5/0091
See application file for complete search history.

(56) References Cited

U.S. PATENT DOCUMENTS

| | | |
|---|---|---|
| 2009/0197630 A1 | 8/2009 | Ahn et al. |
| 2009/0238091 A1 | 9/2009 | Kim et al. |

(Continued)

FOREIGN PATENT DOCUMENTS

| | | |
|---|---|---|
| CN | 101730985 A | 6/2010 |
| CN | 101884179 A | 11/2010 |

(Continued)

OTHER PUBLICATIONS

3rd Generation Partnership Project; Technical Specification Group Radio Access Network; Evolved Universal Terrestrial Radio Access (E-UTRA); Physical layer for relaying operation (Release 10), 3GPP TS 36.216 V10.3.1, Technical Specification, Sep. 2011, 16 pages.

(Continued)

*Primary Examiner* — Jae Y Lee
*Assistant Examiner* — Aixa A Guadalupe Cruz
(74) *Attorney, Agent, or Firm* — Slater Matsil, LLP

(57) ABSTRACT

A method for operating a communications controller includes selecting a search space configuration out of a set of candidate search space configurations for a user equipment served by the communications controller, wherein the search space configuration specifies one or more search spaces to be monitored out of a set of search spaces, and signaling the selected search space configuration to the user equipment.

24 Claims, 12 Drawing Sheets

Related U.S. Application Data continuation of application No. 13/754,622, filed on Jan. 30, 2013, now Pat. No. 9,603,034.

(60) Provisional application No. 61/592,401, filed on Jan. 30, 2012.

(51) Int. Cl.
*H04W 24/02* (2009.01)
*H04W 72/20* (2023.01)
*H04W 74/0833* (2024.01)
*H04W 72/02* (2009.01)

(52) U.S. Cl.
CPC ........ *H04W 74/0833* (2013.01); *H04W 72/02* (2013.01)

(56) References Cited

U.S. PATENT DOCUMENTS

| | | | |
|---|---|---|---|
| 2010/0080323 | A1 | 4/2010 | Mueck et al. |
| 2010/0120442 | A1 | 5/2010 | Zhuang et al. |
| 2010/0135237 | A1 | 6/2010 | Papasakellariou et al. |
| 2010/0279628 | A1 | 11/2010 | Love et al. |
| 2011/0051711 | A1* | 3/2011 | Kishiyama ............ H04L 5/0092 370/350 |
| 2011/0069637 | A1 | 3/2011 | Liu et al. |
| 2011/0110316 | A1 | 5/2011 | Chen et al. |
| 2011/0250913 | A1* | 10/2011 | Vajapeyam ....... H04W 74/0833 455/507 |
| 2012/0009963 | A1 | 1/2012 | Kim et al. |
| 2012/0020311 | A1 | 1/2012 | Yamada et al. |
| 2012/0087318 | A1 | 4/2012 | Liu et al. |
| 2012/0188961 | A1* | 7/2012 | Suzuki .............. H04W 74/0833 370/329 |
| 2012/0275428 | A1 | 11/2012 | Feng et al. |
| 2013/0012206 | A1 | 1/2013 | Kitazoe |
| 2013/0039188 | A1 | 2/2013 | Larsson et al. |
| 2013/0064216 | A1 | 3/2013 | Gao et al. |
| 2013/0083739 | A1 | 4/2013 | Yamada |
| 2013/0083753 | A1 | 4/2013 | Lee et al. |
| 2013/0109391 | A1 | 5/2013 | Lee et al. |
| 2013/0182626 | A1 | 7/2013 | Kuo |
| 2013/0303203 | A1 | 11/2013 | Wang et al. |
| 2014/0086188 | A1 | 3/2014 | Hoymann et al. |
| 2014/0120936 | A1 | 5/2014 | Chen et al. |
| 2014/0133433 | A1 | 5/2014 | Ahn et al. |
| 2014/0169316 | A1 | 6/2014 | Kim et al. |
| 2014/0247788 | A1 | 9/2014 | Kim et al. |
| 2014/0286285 | A1 | 9/2014 | Park et al. |
| 2015/0245323 | A1 | 8/2015 | You et al. |
| 2016/0007316 | A1 | 1/2016 | Vaidya et al. |
| 2016/0135146 | A1 | 5/2016 | Schier et al. |
| 2016/0198406 | A1 | 7/2016 | Höglund et al. |
| 2016/0234804 | A1 | 8/2016 | Hu et al. |
| 2017/0055211 | A1 | 2/2017 | Yu |
| 2019/0069297 | A1 | 2/2019 | Lee et al. |

FOREIGN PATENT DOCUMENTS

| | | |
|---|---|---|
| CN | 102017694 A | 4/2011 |
| CN | 102202415 A | 9/2011 |
| CN | 102231917 A | 11/2011 |
| CN | 102238754 A | 11/2011 |
| CN | 102325382 A | 1/2012 |
| WO | 2008157692 A2 | 12/2008 |
| WO | 2009118704 A1 | 10/2009 |

OTHER PUBLICATIONS

"3rd Generation Partnership Project; Technical Specification Group Radio Access Network; Evolved Universal Terrestrial Radio Access (E-UTRA); Physical Channels and Modulation (Release 10)," 3GPP TS 36.211 V10.4.0, Technical Specification, Dec. 2011, 101 pages.

3GPP TS 36.212 V10.4.0 (Dec. 2011); 3rd Generation Partnership Project; Technical Specification Group Radio Access Network; Evolved Universal Terrestrial Radio Access (E-UTRA); Multiplexing and channel coding (Release 10), 79 pages.

"3rd Generation Partnership Project; Technical Specification Group Radio Access Network; Evolved Universal Terrestrial Radio Access (E-UTRA); Physical layer procedures (Release 10)," 3GPP TS 36.213 V10.4.0, Technical Specification, Dec. 2011, 125 pages.

3GPP TS 36.300 V11.0.0 (Dec. 2011); 3rd Generation Partnership Project; Technical Specification Group Radio Access Network;Evolved Universal Terrestrial Radio Access (E-UTRA) and Evolved Universal Terrestrial Radio Access Network (E-UTRAN); Overall description; Stage 2 (Release 11), 194 pages.

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 V10.4.0, Technical Specification, Dec. 2011, 296 pages.

Extended European Search Report received in Application No. 13743294.4-1851 mailed Jan. 8, 2015, 7 pages.

International Search Report and Written Opinion of Patent Cooperation Treaty (PCT), International Application No. PCT/US13/23924, Applicant Futurewei Technologies, Inc., date of mailing Apr. 15, 2013, 12 pages.

Huawei, et al., "Msg2 transmission for RACH based TA on SCell", 3GPP TSG RAN WG1 meeting #67, R1-114084, Nov. 14-18, 2011, 4 Pages, San Francisco, USA.

LG Electronics, "Discussion on multiple TA for carrier aggregation", 3GPP TSG RAN WG1 #66, R1-112330, Aug. 22-26, 2011, 6 Pages, Athens, Greece.

Research in Motion et al., "RACH Procedure for Multiple Timing Advances", 3GPP TSG RAN WG1 Meeting #67, R1-113961, Nov. 14-18, 2011, 4 Pages, San Francisco, USA.

Texas Instruments, "Discussion of RA procedure on a SCell", 3GPP TSG RAN WG1 #67, R1-113775, Nov. 14-18, 2011, 4 Pages, San Francisco, USA.

3GPP TSG RAN WG1 meeting #65 R1-111253,"Investigation on downlink control channel and signaling enhancements", Huawei, HiSilicon, May 9-13, 2011, 3 pages.

3GPP TSG RAN WG1#66 R1-112049,"Investigation on downlink control channel and signalling enhancements", Huawei, HiSilicon ,Aug. 22-26, 2011, 4 pages.

3GPP TSG-RAN WG1 #66bis R1-113396,"E-PDCCH Requirements", Qualcomm Incorporated, Oct. 10-14, 2011, 4 pages.

3GPP TSG RAN WG1 Meeting #67 R1-113654,"ePDCCH multiplexing with PDSCH", Huawei, HiSilicon, Nov. 14-18, 2011, 4 pages.

Huawei, et al., "Considerations on the ePDCCH design," 3GPP TSG RAN WG1 Meeting #67, R1-113655, San Francisco, USA, Nov. 14-18, 2011, 6 pages.

3GPP TSG-RAN WG1 #67 R1-113680,"Search space for enhanced control channels", Ericsson, ST-Ericsson, Nov. 14-18, 2011, 2 pages.

3GPP TSG RAN WG1 Meeting #67 R1-113743, "Design of E-PDCCH search space", CATT, Nov. 14-18, 2011, 3 pages.

Huawei, et al., "Search space design for ePDCCH," 3GPP TSG RAN WG1 Meeting #68, R1-120048, Dresden, Germany, Feb. 6-10, 2012, 6 pages.

* cited by examiner

SYSTEM AND METHOD FOR COMMON CONTROL CHANNELS IN A COMMUNICATIONS SYSTEM This application is a continuation of U.S. patent application Ser. No. 15/464,070, filed Mar. 20, 2017, and entitled "System and Method for Common Control Channels in a Communications System," now U.S. Pat. No. 11,140,661 issued Oct. 5, 2021, which is a continuation of U.S. patent application Ser. No. 13/754,622, filed Jan. 30, 2013, and entitled "System and Method for Common Control Channels in a Communications System," now U.S. Pat. No. 9,603,034 issued Mar. 21, 2017, which application claims the benefit of U.S. Provisional Application No. 61/592,401, filed on Jan. 30, 2012, entitled "System and Method for Common ePDCCH for LTE," which applications are hereby incorporated herein by reference.

TECHNICAL FIELD

The present disclosure relates generally to digital communications, and more particularly to a system and method for common control channels in a communications system.

BACKGROUND

With ever increasing demand for data at higher data rates, communications systems, such as cellular communications systems, need to utilize spectrum in more efficient ways. The Third Generation Partnership Project (3GPP) Long Term Evolution (LTE) is one standardized specification for a cellular communications system. Within the context of upcoming 3GPP LTE standards releases, contributors are looking for ways to improve performance and efficiency.

In a cellular communications system, a communications controller such as an enhanced NodeB (eNB) (also commonly referred to as a base transceiver station (BTS), a NodeB (NB), a base station, access point, and the like) cover a specified geographic area. The eNB serves one or more user equipment (UE) (also commonly referred to as a terminal, subscriber, user, mobile station, mobile, and the like). The eNB sends information to the UE and receives information from the UE. The eNB typically controls communications of UEs operating within its geographic area.

SUMMARY OF THE DISCLOSURE

Example embodiments of the present disclosure which provide a system and method for common control channels in a communications system.

In accordance with an example embodiment of the present disclosure, a method for operating a communications controller is provided. The method includes selecting, by the communications controller, a search space configuration out of a set of candidate search space configurations for a user equipment served by the communications controller, wherein the search space configuration specifies one or more search spaces to be monitored out of a set of search spaces, and signaling, by the communications controller, the selected search space configuration to the user equipment.

In accordance with another example embodiment of the present disclosure, a method for operating a user equipment is provided. The method includes receiving, by the user equipment, a selected search space configuration from a communications controller serving the user equipment, wherein the search space configuration specifies one or more search spaces to be monitored out of a set of search spaces, and monitoring, by the user equipment, the one or more search spaces specified by the selected search space configuration for a control channel intended for the user equipment.

In accordance with another example embodiment of the present disclosure, a method for operating a user equipment is provided. The method includes selecting, by the user equipment, a preamble for a message, wherein the preamble corresponds to a first search space that the user equipment monitors for a control channel, transmitting, by the user equipment, the message and the selected preamble to a communications controller serving the user equipment, and monitoring, by the user equipment, the first search space for the control channel.

In accordance with another example embodiment of the present disclosure, a method for operating a communications controller is provided. The method includes receiving, by the communications controller, a first message including a preamble from a user equipment, wherein the preamble indicates a first search space monitored by the user equipment, determining, by the communications controller, the first search space in accordance with the preamble, and transmitting, by the communications controller, control information to the user equipment, the control information transmitted in resource elements of the first search space.

In accordance with another example embodiment of the present disclosure, a communications controller is provided. The communications controller includes a processor, and a transmitter operatively coupled to the processor. The processor selects a search space configuration out of a set of candidate search space configurations for a user equipment served by the communications controller, where the search space configuration specifies one or more search spaces to be monitored out of a set of search spaces, and generates a first message in accordance with the selected search space configuration. The transmitter transmits the first message to the user equipment.

In accordance with another example embodiment of the present disclosure, a user equipment is provided. The user equipment includes a receiver, and a processor operatively coupled to the receiver. The receiver receives a selected search space configuration from a communications controller serving the user equipment, where the search space configuration specifies one or more search spaces to be monitored out of a set of search spaces. The processor monitors a search space specified by the selected search space configuration for a first control channel intended for the user equipment.

In accordance with another example embodiment of the present disclosure, a user equipment is provided. The user equipment includes a processor, and a transmitter operatively coupled to the processor. The processor selects a preamble for a message, where the preamble corresponds to a first search space that the user equipment monitors for a control channel, and monitors the first search space for the control channel. The transmitter transmits the message and the selected preamble to a communications controller serving the user equipment.

In accordance with another example embodiment of the present disclosure, a communications controller is provided. The communications controller includes a receiver, a processor operatively coupled to the receiver, and a transmitter operatively coupled to the processor. The receiver receives a first message including a preamble from a user equipment, wherein the preamble indicates a first search space monitored by the user equipment. The processor determines the first search space in accordance with the preamble. The transmitter transmits control information to the user equipment, the control information transmitted in resource elements of the first search space.

One advantage of an embodiment is that signaling of common search spaces and/or search space configurations is reduced, thereby reducing signaling overhead and improving overall communications system efficiency.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to common control channels in a communications system. For example, at a communications controller, the communications controller selects a search space configuration out of a set of candidate search space configurations for a user equipment served by the communications controller, where the search space configuration specifies one or more search spaces to be monitored out of a set of search spaces, and signals the selected search space configuration to the user equipment. As another example, at a communications controller, the communications controller receives a first message including a preamble from a user equipment, wherein the preamble indicates a first search space monitored by the user equipment, determines the first search space in accordance with the preamble, and transmits control information to the user equipment, the control information transmitted in resource elements of the first search space.

The present disclosure will be described with respect to example embodiments in a specific context, namely a 3GPP LTE compliant communications system that supports control channels with configurable search spaces. The disclosure may also be applied, however, to other standards compliant and non-standards compliant communications systems that support control channels with configurable search spaces.

Figure 1:
FIG. 1 illustrates an example communications system according to example embodiments described herein.
Figure 1:
Figure 1:
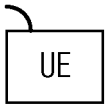
Figure 1:
Figure 1:
Figure 1:
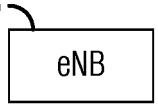
Figure 1:
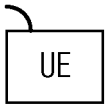
Figure 1:
Figure 1:
Figure 1:
Figure 1:
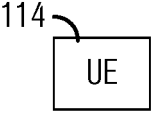
Figure 1:
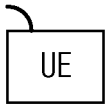
Figure 1:

FIG. 1 illustrates a communications system 100. Communications system 100 includes an eNB 105. eNB 105 may wirelessly serve a plurality of UE, such as UE 110, UE 112, UE 114, and UE 116. Usually, communications to a UE or from a UE must flow through eNB 105. As an example, in a particular form of communications referred to as machine-type communications (MTC), a MTC UE may send information, such as sensor readings, security information, and the like, to an application by way of an eNB. In MTC, communications needs (such as bandwidth, communications frequency, latency, and the like) of an individual MTC UE are relatively small. As shown in FIG. 1, UE 114 and UE 116 may communicate directly with one another without using eNB 105. However, they may also communicate with other device through eNB 105.

While it is understood that communications systems may employ multiple eNBs capable of communicating with a number of UEs, only one eNB, and a number of UEs are illustrated for simplicity.

Figure 2:
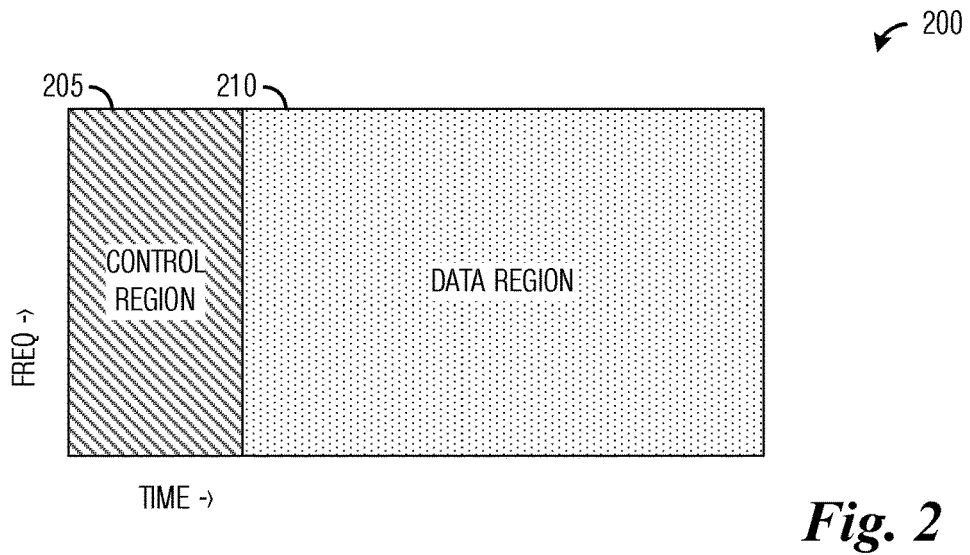
FIG. 2 illustrates an example subframe of a 3GPP LTE compliant communications system according to example embodiments described herein.

FIG. 2 illustrates a subframe 200 of a 3GPP LTE compliant communications system. Subframe 200 may be representative of a subframe transmitted by an eNB of a 3GPP LTE Release 10 (Rel-10) compliant communications system. Subframe 200 includes both time resources and frequency resources, which may simply be referred to as time-frequency resources. Subframe 200 comprises control channels transmitted in a control region 205 and data channels transmitted in a data region 210.

One of the control channels transmitted in control region 205 is the physical downlink control channel (PDCCH), which may be used for transmitting control information such as resource allocation grants (e.g., for uplink data transmission by the UE) and resource allocation assignments (e.g., for downlink data transmission to the UE) to UEs. Without loss of generality, resource grant can be used to refer to both resource allocation grants and resource allocation assignments. The PDCCH may also be used for transmitting power control commands. The PDCCH is located in the first several symbols (e.g., one to four symbols) of a subframe. The symbols used to bear the PDCCH make up control region 205 and may also be referred to as a control domain. Other symbols of subframe 200 are used for data transmission, i.e., data region 210 (or equivalently, data domain).

Other control channels may also be transmitted in control region 205, including a physical hybrid indicator channel (PHICH) used to transmit acknowledgements and/or negative acknowledgements (ACK/NACK) in response to uplink data transmissions, a physical control format indicator channel (PCFICH) used to indicate the number of symbols in control region 205 of subframe 200.

Control region 205 comprises one or more control channel elements (CCEs). There is a mapping procedure for assigning the resource elements that comprise each CCE to both a time location and frequency location within control region 205. A CCE may use non-contiguous resources to exploit frequency diversity. A particular PDCCH assignment and/or grant may occupy 1, 2, 4, or 8 consecutive CCEs. A UE uses search space rules to identify possible CCEs that contain resource assignments (i.e., a PDCCH) for it. The search space rules may have provisions for a common search space. A search space rule may indicate which set of CCEs may convey a PDCCH directed towards a UE (or a group of UEs). A UE may have to perform blind decoding over the set of CCEs to determine if a PDCCH is transmitted to that UE.

Generally, there are two types of search spaces: a common search space (CSS) and a UE specific search space (USS). A CSS comprises a set of CCEs that is searched (monitored) by UEs served by an eNB and may contained multiple PDCCHs intended for multiple UEs, while a USS comprises a set of CEEs that is searched (monitored) by a single UE or a single group of UEs and may contain multiple PDCCHs that are intended only for the single UE or the single group of UEs. In some instances, the CSS and USS may have some CCEs in common for a given UE.

Symbols in a control region, such as control region 205, are not used to carry data. Therefore, if there are not many control channels to transmit, the unused resource elements in the control region are wasted because they cannot be used to carry data. For a Rel-10 compliant communications system, at most 13 symbols per 14 symbol subframe may be used for data transmission. In order to improve efficiency, an enhanced physical downlink control channel (ePDCCH) is being discussed for Release-11 (Rel-11) and later versions of the 3GPP LTE technical standards. With the ePDCCH, it has been proposed to extend the search space concept. An ePDCCH search space may consist of a set of enhanced CCEs (eCCEs) and may be defined in terms of eCCEs or physical resource blocks (PRBs) pairs with a PRB pair comprising multiple eCCEs, such as two or four eCCEs per PRB pair. It is noted than unlike the PDCCH search space, the eCCEs (or PRBs) that are not used for ePDCCH transmission may be used for other transmission (e.g., other ePDCCH, PDSCH, other channels, and the like). Without loss of generality, the term "resource blocks" (RBs) is used interchangeably with physical resource blocks. Furthermore, RB can indicate the bandwidth of the system. There can be 12 resource elements in the frequency domain in an RB. As an example, 6 RBs can represent a 1.4 MHz LTE carrier. As another example, 100 RBs can represent a 20 MHz LTE carrier.

For UEs receiving control information, such as resource assignments, on an ePDCCH, it may be possible to use more symbols for data transmission (up to 14) than for UEs receiving assignments with the PDCCH (up to 13). In the extreme case, it may even be possible to have a standalone carrier, with no PDCCH, and an ePDCCH only. Consequently, means and methods for a UE to find its assignments and grants on the ePDCCH on a standalone carrier must be provided. A solution to this problem is to use an ePDCCH common search space. The ePDCCH CSS may have similar functionality as the PDCCH CSS, e.g., to convey resource assignments for system information broadcasts (SIBs), paging, and random access responses, to send power control commands, and the like.

Furthermore, there are two types of ePDCCH search spaces.

1. A UE specific ePDCCH search space, specific to one UE (or a group of UEs). The UE specific ePDCCH search space may be indicated to the UE by higher layer signaling (RRC signaling), dynamic signaling (PDCCH or ePDCCH), or may be preconfigured, e.g., a formula-based calculation or a fixed location. It is noted that the UE specific ePDCCH search space may also be referred to as a USS. In situations that will lead to confusion with the UE specific search space of the PDCCH, further differentiation will be provided.

2. A common ePDCCH search space that all UEs may search. The common ePDCCH search space may be used to send resource assignments and/or other signaling information. It is noted that the common ePDCCH search space may also be referred to as a CSS. In situations that will lead to confusion with the common search space of the PDCCH, further differentiation will be provided.

It is noted that an ePDCCH search space may be a combination of search spaces, such as shown in example Table 3.

Therefore, in a communications system with both ePDCCHs and PDCCHs on the same carrier, there is a possibility of having two USS (one for the ePDCCH and one for the PDCCH) and two CSS (one for the ePDCCH and one for the PDCCH). A UE may not need to monitor all four of the search spaces. Hence, there is a need for signaling to the UE which search space(s) to monitor.

In a situation where a wideband carrier is used, there may be coexisting UEs with different bandwidth capabilities. As an illustrative example, there may be a 20 MHz regular UE and a 6 RB sensor UE (an MTC UE, for example) sharing the same carrier frequency and receiving data on the same carrier. Given that the sensor UE may make use of ePDCCHs but may not monitor the entire 20 MHz bandwidth of the wideband carrier, it is necessary to provide means and method for the UEs to find their resource assignments on the ePDCCH.

As discussed above, the ePDCCH is proposed to (amongst other things) assign resource grants to Rel-11 compliant UEs. The ePDCCH is generally thought to be at least frequency domain multiplexed (FDM) within a subframe. It is noted that in addition, the ePDCCH may be time domain multiplexed (TDM), spatially multiplexed, or code domain multiplexed (CDM) with other channels, such as data channels. For simplicity, and without loss of generality, the following description focuses on FDM. However, adding TDM, spatial multiplexing, and/or CDM components is straight forward.

Figure 3A:
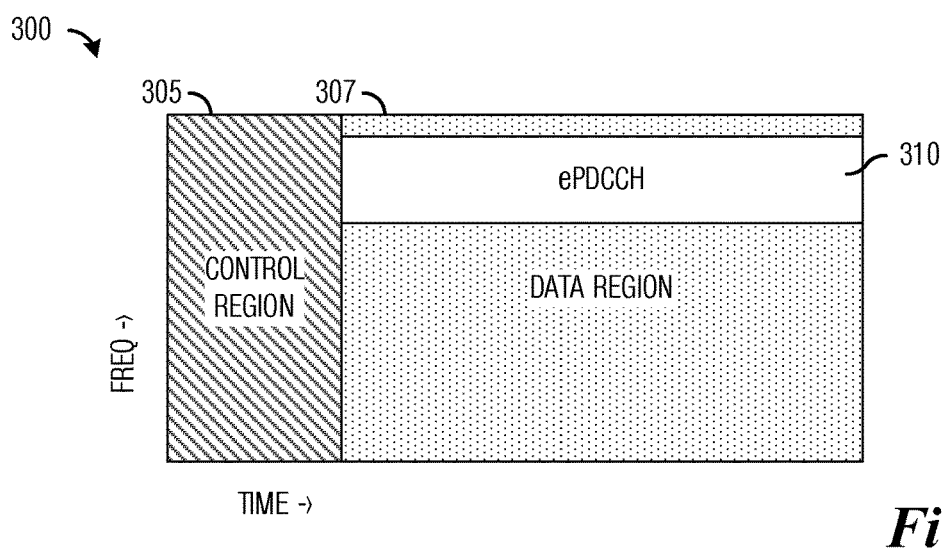
FIG. 3a illustrates an example subframe wherein an ePDCCH is transmitted in a data region according to example embodiments described herein.

FIG. 3a illustrates a subframe 300 wherein an ePDCCH is transmitted in a data region. Subframe 300 includes a control region 305, a data region 307, and an ePDCCH 310. ePDCCH 310 is transmitted only in data region 307.

Figure 3B:
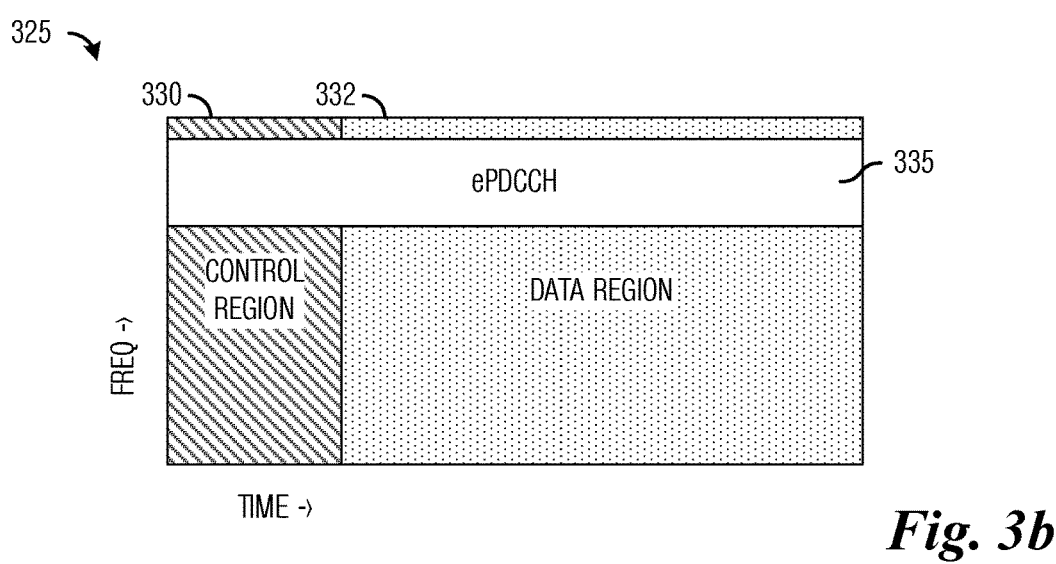
FIG. 3b illustrates an example subframe wherein an ePDCCH is transmitted in a control region and a data region according to example embodiments described herein.

FIG. 3b illustrates a subframe 325 wherein an ePDCCH is transmitted in a control region and a data region. Subframe 325 includes a control region 330, a data region 332, and an ePDCCH 335. ePDCCH 335 is transmitted in both control region 330 and data region 332. It is noted that the representations shown in FIGS. 3a and 3b are in the logical domain and that the ePDCCHs (ePDCCH 310 and ePDCCH 335) may occupy non-contiguous frequency resources.

Figure 3C:
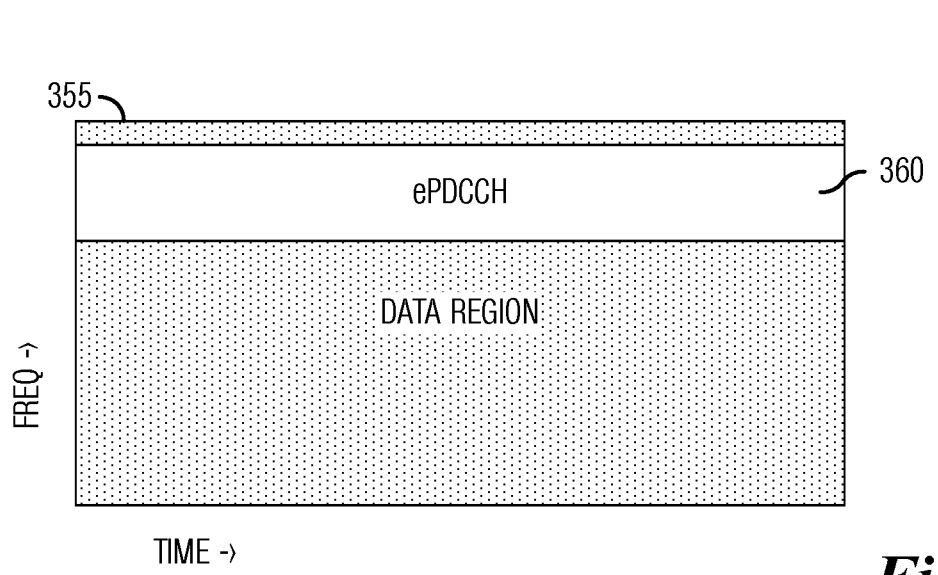
FIG. 3c illustrates an example subframe wherein subframe has no control region according to example embodiments described herein.

FIG. 3c illustrates a subframe 350 wherein subframe 350 has no control region. Subframe 350 includes a data region 355 and an ePDCCH 360. Subframe 350 represents a subframe with a standalone carrier without any control region. In such a situation, a UE receiving subframe 350 may rely on ePDCCH 360 to obtain its signaling information.

Due to complexity reasons, the USS may not occupy the entire set of RBs available for transmission. As an illustrative example, if a carrier's bandwidth is 20 MHz, there are a total of 100 PRB pairs or 400 eCCEs. It may be prohibitively complex for a UE to process a USS consisting of all of the PRB pairs or eCCEs. Similarly, the CSS may not occupy the available bandwidth in its entirety. Due to the complexity, the UE may not be able to receive some of the signaling information (e.g., a higher layer message, such as radio resource control (RRC) signaling) since the resource assignment for the signaling information is sent on either the ePDCCH or the PDCCH.

Figure 3D:
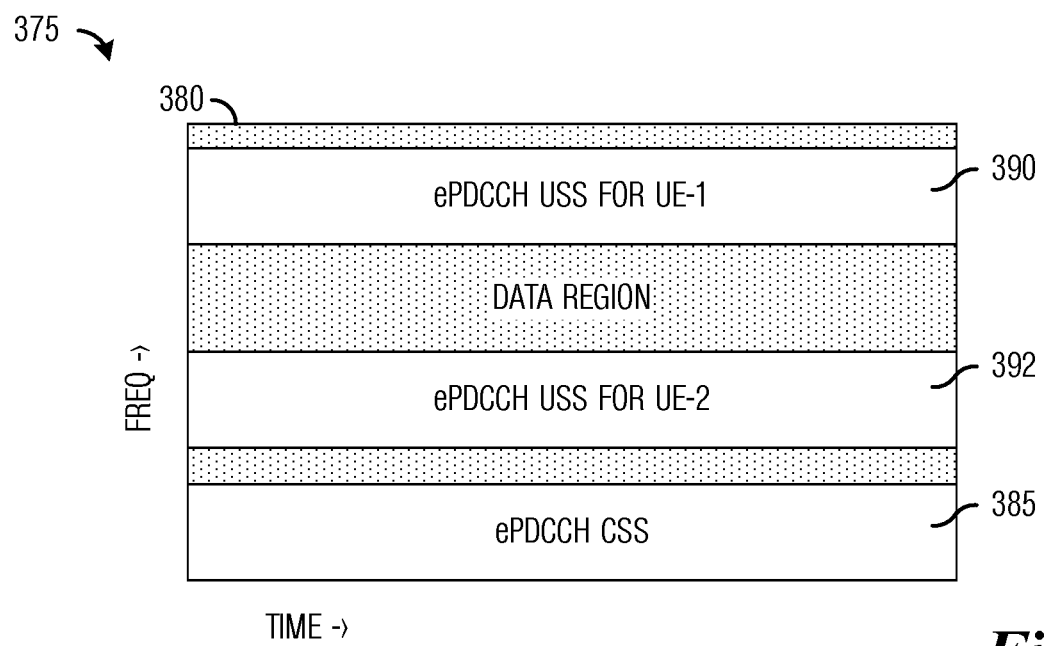
FIG. 3d illustrates an example subframe wherein subframe includes multiple search spaces according to example embodiments described herein.

FIG. 3d illustrates a subframe 375 wherein subframe 375 includes multiple search spaces. Subframe 375 includes a data region 380, a CSS 385, a USS for UE-1 390, and a USS for UE-2 392. As discussed previously, CSS 385 may be monitored by multiple UEs, while USS for UE-1 390 may only be monitored by UE-1 and USS for UE-2 392 may only monitored by UE-2.

It is noted that the configuration of CSS 385 (i.e., the RBs or eCCEs associated with CSS 385) may be the same configuration used for all eNBs and known a priori by the UEs. It is also noted that the configuration of CSS 385 may be different from the configuration of CSSs from other eNBs and may be derived from eNB specific information, such as eNB identifier (obtainable from decoding a synchronization channel). The information regarding the configuration of the CSSs may also be transmitted on a broadcast channel. The transmitted configuration information may include set of RBs or eCCEs reserved for the CSSs. It is also noted that technical standards may define an a priori configuration for the CSS or how to generate the configuration of the CSS based on the eNB specific information.

Figure 4A:
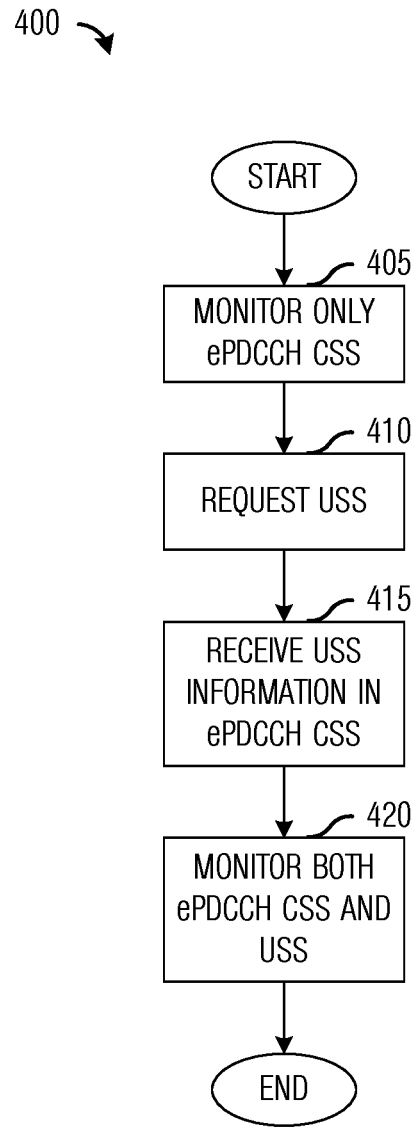
FIG. 4a illustrates an example flow diagram of operations occurring in a UE as the UE requests a USS according to example embodiments described herein.

FIG. 4a illustrates a flow diagram of operations 400 occurring in a UE as the UE requests a USS. Operations 400 may be indicative of operations occurring at a UE, such as UEs 110-116, as the UE requests a USS.

Operations 400 may begin with the UE monitoring an ePDCCH CSS (block 405). Initially, while the UE does not know its USS (e.g., its ePDCCH USS), the UE monitors the CSS (e.g., the ePDCCH CSS). The CSS may be located at a standards specified location, an operator defined location, derived from information related to an eNB serving the UE (e.g., an identifier of the eNB and/or cell, the bandwidth of the transmission, an operating mode (e.g., time division duplex, and frequency division duplex) of the eNB, a carrier type of the eNB, and the like), and the like. As an illustrative example, the attributes of the CSS, such as its location and number of RBs used, may be standards specified. The UE may monitor the CSS by performing blind decodings of RBs or eCCEs associated with the CSS.

It is noted that the ePDCCH CSS may be a temporary CSS (i.e., an initial access CSS) that the UE monitors when it enters the communications system. The UE may then obtain an actual ePDCCH CSS in the same way that it obtains the ePDCCH USS. In such a situation, it may be advantageous to send an indication on a random access channel (RACH) when the UE uses the random access procedure (which involves use of RACH messages) for the first time to inform the eNB that UE does not know its search spaces (the USS and/or the CSS). This may be achieved using a specific preamble sequence on the RACH, for example. The eNB knows it should use the temporary CSS in responding to the RACH. Otherwise, the eNB may use the actual ePDCCH CSS or even the PDCCH CSS. In this example, the temporary CSS may convey resource assignments for the system information block which carries configuration parameters that can enable a UE to perform RACH.

The UE may send a request to the eNB for a USS (block 410). The UE may send the request for the USS in the form of an explicit search space request message, such as a REQ_UE_SS message, or an implicit message. The request may be transmitted by itself or piggybacked onto another message being sent to the eNB.

The UE may receive information about the USS in a message received over RBs indicated by a control channel in the CSS (block 415). In other words, the UE may receive a control channel intended for it in the CSS and the control channel includes a resource allocation of RBs used to transmit information about the USS to the UE. The information about the USS may include which RBs or eCCEs of a subframe that make up the USS. The information may explicitly specify which RBs or eCCEs. Alternatively, the information may specify a starting RB or eCCE and then a number of RBs or eCCEs in the USS. The UE may monitor the USS and/or the CSS for further control channels (block 420).

Figure 4B:
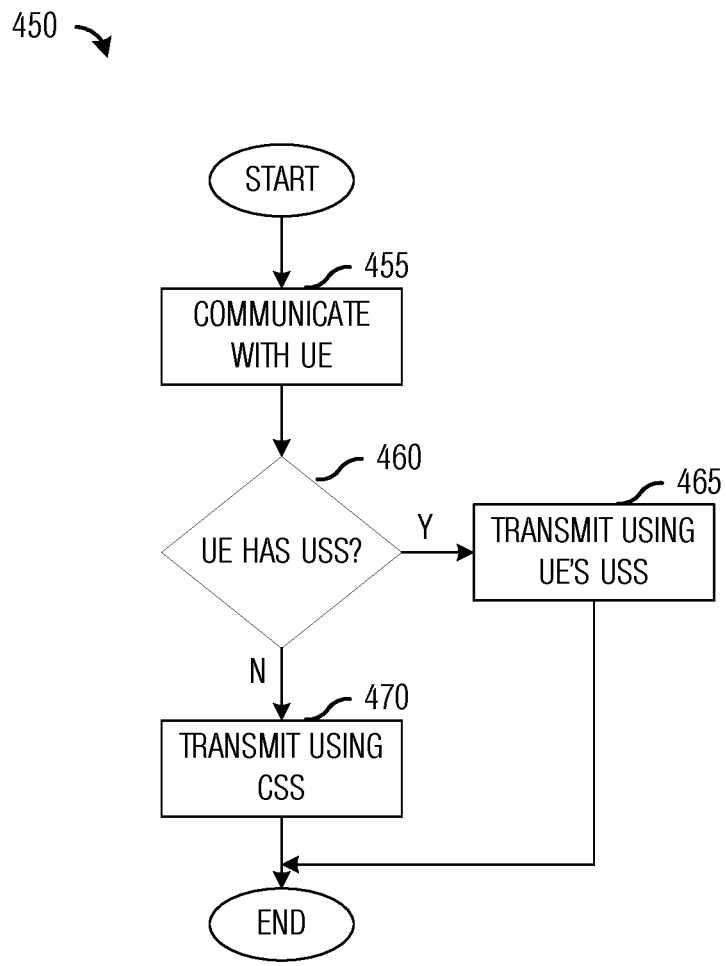
FIG. 4b illustrates an example flow diagram of operations occurring in an eNB as the eNB communicates with a UE according to example embodiments described herein.

FIG. 4b illustrates a flow diagram of operations 450 occurring in an eNB as the eNB communicates with a UE. Operations 450 may be indicative of operations occurring in an eNB, such as eNB 105, when the eNB is to communicate with a UE (block 455). As an example, the eNB may have a transmission, such as a resource allocation, control information, data, information, and the like, for the UE. As another example, the eNB may be responding to a message from the UE, such as a request of some form from the UE.

The eNB may perform a check to determine if the UE has a USS (block 460). In other words, the eNB may check to determine if it has provided the UE with information about a USS for express use by the UE, i.e., the UE knows its USS. If the UE does know its USS, the eNB may transmit using the UE's USS (block 465). Transmitting using the USS may include signaling to the UE a resource allocation indicating RBs that will be used to carry the control information, data, information, and the like, in the USS and then transmitting the data, information, and the like, in the RBs indicated by the resource allocation. If the UE does not know its USS, the eNB may transmit to the UE using the CSS (block 470). It is noted that transmitting resource assignments on the CSS may be similar to transmitting resource assignments using the USS.

It is noted that in some situations, the eNB may decide to transmit to the UE using the CSS even if the UE knows its USS. As an illustrative example, the resource assignments for some forms of control information, such as a system information block (SIB), may be transmitted using the CSS.

In general, when a UE communicates to its eNB using the random access procedure, the eNB does not know the characteristics of the UE, for example, the eNB does not know if the UE is monitoring a USS. As another example, if the communications system uses both a CSS for the PDCCH and a CSS for the ePDCCH, the eNB may not know which search space the UE is monitoring. This is due to the fact that the UE does not send identification information about itself in the RACH message used in the random access procedure. The RACH message includes a RACH preamble. Hence, the eNB is unaware of the UE's use of the USS, as well as the location of the USS of the UE.

Figure 5A:
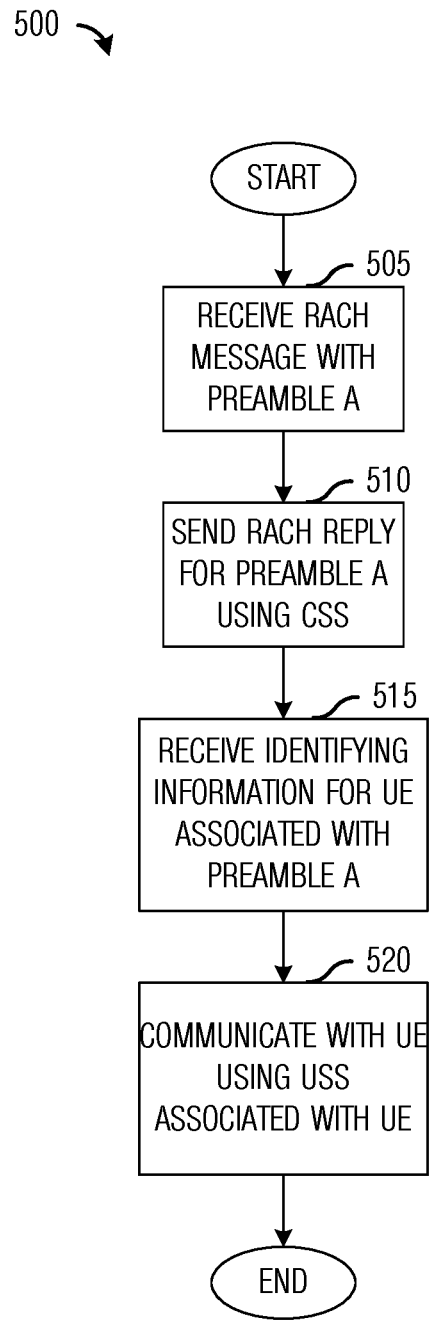
FIG. 5a illustrates an example flow diagram of operations occurring in an eNB as the eNB uses identification information of a UE to identify a USS of the UE according to example embodiments described herein.

FIG. 5a illustrates a flow diagram of operations 500 occurring in an eNB as the eNB uses identification information of a UE to identify a USS of the UE. Operations 500 may be indicative of operations occurring in an eNB, such as eNB 105, as the eNB determines identification information of a UE to identify a USS used by the UE.

Operations 500 may begin with the eNB receiving a RACH message from a UE (block 505). As discussed previously, the RACH message includes a preamble A (or an indication of A by the type of waveform used as the preamble) and no other identifying information of the UE. Therefore, the eNB may not be able to identify the UE and determine if the UE is monitoring its USS.

The eNB may respond to the RACH message with a RACH reply message (block 510). The eNB may utilize the CSS to transmit the RACH reply message. The RACH reply message includes the preamble A to help the UE determine that it is the intended recipient of the RACH reply message. The eNB may also include a resource allocation to permit the UE to respond. The eNB may receive a message including identifying information of the UE associated with preamble A (block 515). As an example, the message may include an identifier of the UE. Using the identifying information, the eNB is able to determine the UE and its capabilities, e.g., if the UE is monitoring its USS. The eNB may communicate with the UE using the USS associated with the UE (block 520).

It is noted that for reasons such as robustness or for signaling messages, the eNB may continue to use the CSS. It is also noted that the discussion of operations 500 focuses on the CSS, operations 500 may also be applicable to a situation where a UE makes use of temporary CSSs and actual CSSs.

Figure 5B:
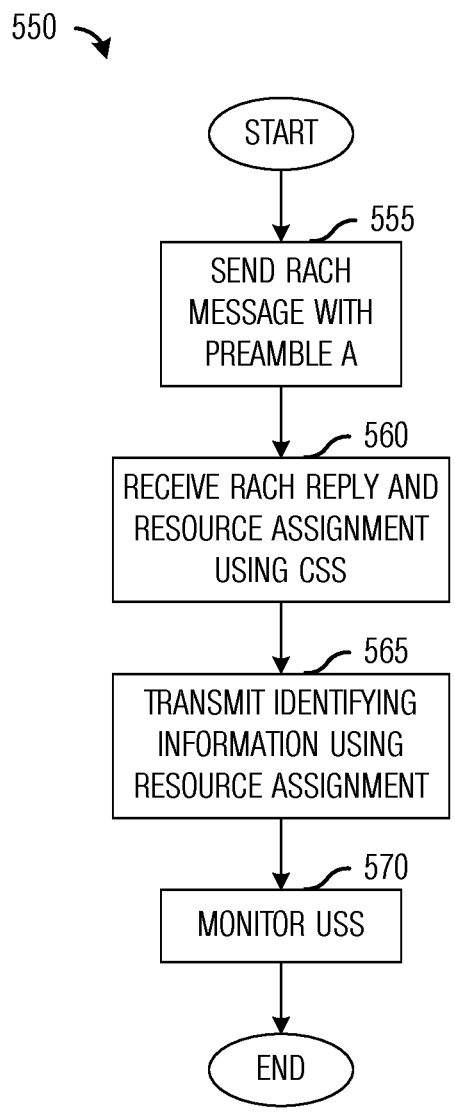
FIG. 5b illustrates an example flow diagram of operations occurring in a UE wherein identification information of the UE is used to determine the USS monitored by the UE according to example embodiments described herein.

FIG. 5b illustrates a flow diagram of operations 550 occurring in a UE wherein identification information of the UE is used to determine the USS being monitored by the UE. Operations 550 may be indicative of operations occurring in a UE, such as UEs 110-116, as the UE provides identification information to help determine the USS being monitored by the UE.

Operations 550 may begin with the UE sending a RACH message to its serving eNB (block 555). As discussed previously, the RACH message contains a preamble A (or some indication of preamble A) selected by the UE and little other identifying information. The UE may receive a RACH reply message from the eNB (block 560). Since the eNB is not able to identify the UE from the RACH message, the eNB uses the CSS to deliver the RACH reply message. In order to receive the message, the UE may need to monitor the CSS.

The RACH reply message may also include a resource allocation to permit the UE to respond to the RACH reply message. The UE may send identification information about itself (e.g., its UE identifier) to the eNB (block 565). With the identification information, the eNB may be able to determine the capabilities of the UE, including whether or not the UE is monitoring a USS. For discussion purposes, consider a situation wherein the UE is monitoring a USS. The UE may then monitor the USS (block 570).

The use of a single CSS for all UEs served by an eNB may be problematic. An example issue of concern may be that with a single ePDCCH CSS for all UE, the implementation of a heterogeneous network (HetNet) with multiple node tiers may result in a region(s) that is free from interference and another region(s) with heavy interference. It may be possible to have multiple different CSSs that may be assigned to the UEs, depending on an interference situation of the UEs, for example. The UE may be able to select a CSS and then inform the eNB of its choice.

According to an example embodiment, a RACH preamble may be used to indicate the CSS selected by the UE. For discussion purposes, let S be the set of possible RACH preambles. In Rel-10, there is a maximum of 64 possible RACH preambles, therefore, S can consist of up to 64 sequences. Partition S into K subsets, denoted $S_0, S_1, \ldots, S_{K-1}$, then for i-th subset $S_i$, there is one corresponding search space $CSS_i$. It is noted that the subsets do not necessarily have to have the same number of members. In other words, some subsets may be larger than others. The RACH preamble chosen may also provide the eNB information about the interference situation the UE observes. As an example, $S_i$ may denote the starting resource block number of the CSS with the CSS having an a priori size (e.g., in terms of PRB pairs).

Although the discussion focuses on the use of the RACH preamble to indicate the CSS selected by the UE to the eNB, other indicators may be used. As an example, a generic indicator may be used to indicate the CSS selected. The generic indicator may be sent in a message to the eNB or piggybacked on another message being sent to the eNB. Therefore, the discussion of the use of the RACH preamble should not be construed as being limiting to either the scope or the spirit of the example embodiments.

Figure 6A:
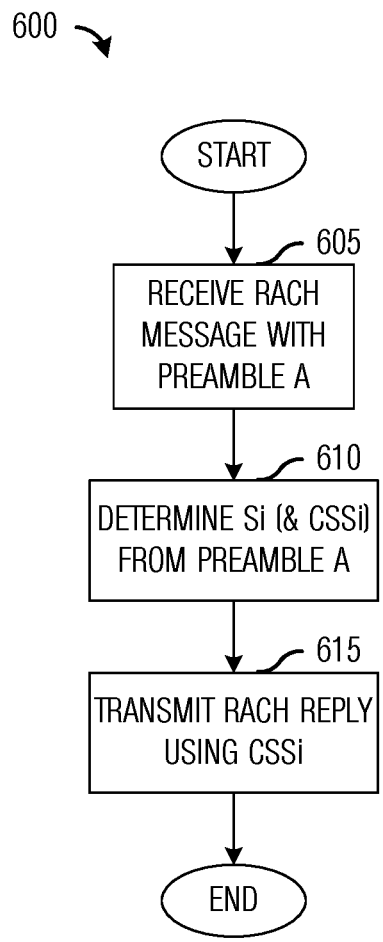
FIG. 6a illustrates an example flow diagram of operations occurring in an eNB as the uses a CSS to transmit to a UE in accordance with an indicator received from the UE according to example embodiments described herein.

FIG. 6a illustrates a flow diagram of operations 600 occurring in an eNB as the eNB uses a CSS to transmit to a UE in accordance with an indicator received from the UE. Operations 600 may be indicative of operations occurring in an eNB, such as eNB 105, as the eNB transmits to the UE using a CSS selected by the UE.

Operations 600 may begin with the eNB receiving a RACH message from the UE (block 605). The RACH message includes a preamble A, which indicates a search space monitored by the UE. The eNB determines a subset of S to which preamble A belongs (block 610). From the preamble A, the eNB may be able to map which subset of S (i.e., $S_0, S_1, \ldots, S_{K-1}$) to which preamble A belongs. The identification of the subset of S may also enable the eNB to determine the CSS that the UE is monitoring. It is noted that preamble A may be represented as a combination of a cyclic shift and a logical root of a waveform.

Table 1 illustrates an example of subsets of S and associated $CSS_i$ with a total bandwidth of 50 RBs. The $CSS_i$ shown in Table 1 are non-overlapping, meaning that they do not share RBs. Table 2 illustrates an example of subsets of S and associated $CSS_i$ with a total bandwidth of 50 RBs. The $CSS_i$ shown in Table 2 are overlapping, meaning that they do share RBs.

TABLE 1

Example of multiple non-overlapping $CSS_i$.

| Set of preamble indexes for $S_i$ | Set of RB indexes for $CSS_i$ |
|---|---|
| 0, . . . , 12 | 0, . . . , 9 |
| 13, . . . , 25 | 10, . . . , 19 |
| 16, . . . , 38 | 20, . . . , 29 |
| 39, . . . , 51 | 30, . . . , 39 |
| 52, . . . , 63 | 40, . . . , 49 |

TABLE 2

Example of multiple overlapping $CSS_i$.

| Set of preamble indexes for $S_i$ | Set of RB indexes for $CSS_i$ |
|---|---|
| 0, . . . , 12 | 0, . . . , 19 |
| 13, . . . , 25 | 10, . . . , 29 |
| 16, . . . , 38 | 20, . . . , 39 |
| 39, . . . , 51 | 30, . . . , 49 |
| 52, . . . , 63 | 40, . . . , 49 |

The eNB may transmit a RACH reply message to the UE using the $CSS_i$ determined from the preamble A (block 615). It is noted that both the eNB and the UE know the subsets of S and the $CSS_i$'s. As an illustrative example, the subsets of S and the $CSS_i$'s may be known a priori, such as defined in a technical standard. The subsets of S and the $CSS_i$'s may be independent of carrier bandwidth. As another illustrative example, the subsets of S and the $CSS_i$'s may be communicated using operations, administration, and maintenance (OAM) signaling. As another illustrative example, the subsets of S and the $CSS_i$'s may be broadcast by the eNB to the UEs. It is also noted that the choice of $CSS_i$ may indicate to the eNB which resource blocks are preferable for communications between the UE and the eNB.

Figure 6B:
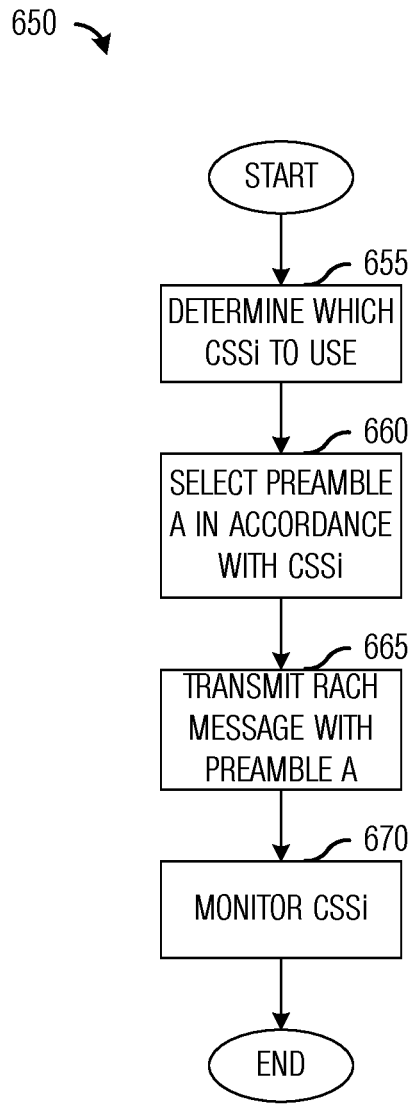
FIG. 6b illustrates an example flow diagram of operations occurring in a UE as the UE receives a transmission from an eNB, wherein the UE monitors a self-selected CSS according to example embodiments described herein.

FIG. 6b illustrates a flow diagram of operations 650 occurring in a UE as the UE receives a transmission from an eNB, wherein the UE monitors a self-selected CSS. Operations 650 may be indicative of operations occurring in a UE, such as UEs 110-116, as the UE selects a CSS and indicates the selected CSS to its serving eNB.

Operations 650 may begin with the UE determining (selecting) a CSS to monitor (block 655). The CSS may be one or more of the CSSs described herein, such as a search space located at least in part in a data region. As an example, the UE may randomly or pseudo-randomly select a number that corresponds to a RACH preamble. Further, the UE may pseudo-randomly select a number within a subset of S, i.e., subset $S_i$. The use of a randomly selected CSS may evenly distribute the use of CSSs by the UEs of the eNB. Alternatively, the UE may follow a specific distribution in its selection of the RACH preamble (and hence, the CSS). Alternatively, the UE may have historic performance information related to the use of the various CSSs and it may select a CSS that has been least used. The historic performance information may be provided by the eNB. The UE may select the RACH preamble that corresponds to the CSS that it selected (block 660).

The UE may transmit a RACH message with the RACH preamble to the eNB (block 665). As discussed previously, from the RACH preamble, the eNB may be able to determine the CSS selected by the UE. The UE may monitor the selected CSS (block 670).

It is noted that the above discussed technique involving the use of an indicator of the CSS selected may also be used with the techniques described in FIGS. 5a and 5b. In such a situation, if there is a limited number of CSS defined with multiple UEs using the same CSS, the above discussed technique may be used to indicate USS.

It is also noted that the CSS selected by the UEs may differ on a subframe to subframe basis. In such a situation, the UE may still use an indicator, such as a RACH preamble to indicate the selected CSS to the eNB. However, depending on which subframe the RACH message from the UE is received, a different CSS may be indicated.

In some configurations, there may be a standalone carrier without PDCCH and its associated control region. Therefore, the eNB may rely on ePDCCHs for signaling control information. However, in many configurations, the eNB may transmit both ePDCCHs and PDCCHs on the same carrier, either in the same subframe or in different subframes. In such a situation, the UEs may need to perform a large number of blind decodes since they need to monitor both CSSs and both USSs.

In order to reduce the number of blind decodes and to enable maximum flexibility to adapt to different deployment scenarios, it may be useful to have a UE monitor part of the PDCCH search space and part of the ePDCCH search space. Table 3 illustrates an example of candidate UE search space configurations for Rel-11 UEs. In Table 3, there is no repetitive search for CSS and USS, resulting in substantially the same number of blind decodes as in Rel-10 and earlier. It is noted that for another embodiment, the number of blind decodes may be different than for Rel-10 and earlier, but using the configurations as the example ones shown in Table 3 may still be useful to reduce the overall number of blind decodes.

TABLE 3

Example configuration of Rel-11 UE search spaces.

| | PDCCH | | ePDCCH | |
|---|---|---|---|---|
| | CSS | USS | CSS | USS |
| Configuration 0 | √ | √ | x | x |
| Configuration 1 | √ | x | x | √ |
| Configuration 2 | x | x | √ | √ |

According to an example embodiment, the eNB may need to know which search space(s) the UE is monitoring. In other words, which search space configuration is the UE using. Several different techniques may be used:

1. The search space configurations may be defined in technical standards, by operator of the communications system, and the like. The search space configurations may differ for different UEs and may depend on factors such as UE capability, network condition, network traffic, and the like. As an example, a UE with a given set of capabilities may be able to monitor the search spaces specified in a particular search space configuration. The eNB may assume that the UE will monitor all search spaces it is capable of monitoring. As an example of a possible search space configurations as defined by a technical standard, Configuration 0 (as shown in Table 3) may be allowed on a first set of subframes within a radio frame while Configuration 1 may be allowed on a second set of subframes of that radio frame.

2. The search space configurations may be signaled in a broadcast message that indicates which search space configuration to use.

3. The search space configuration may be signaled using RRC signaling. RRC signaling may enable the signaling of individual UEs or individual groups of UEs.

4. The search space configuration may be signaled in the form of an indicator signaled in a control channel, such as a PDCCH.

It is noted that in general, the UE may signal its capabilities using higher layer signaling. The RACH signaling used for search space configuration (e.g., the CSS) may provide another mechanism for the UE to use to signal its capabilities.

Figure 7A:
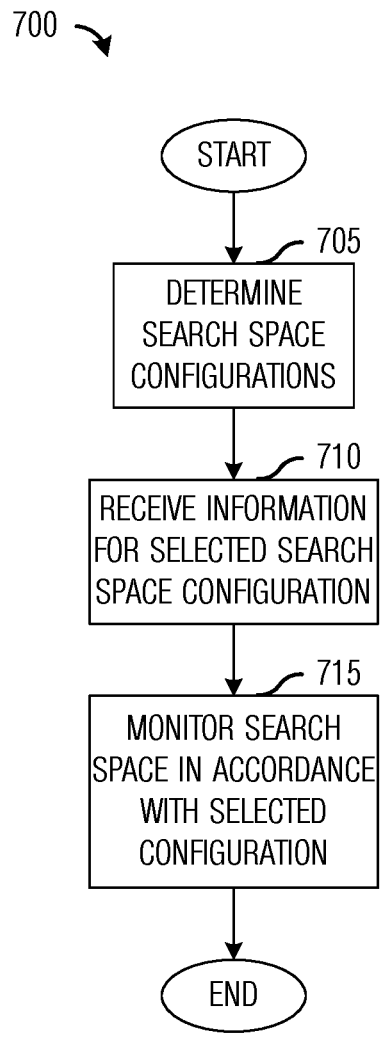
FIG. 7a illustrates an example flow diagram of operations occurring in a UE as the UE determines a search space(s) to monitor in accordance with an indicator of a set of search space configurations according to example embodiments described herein.

FIG. 7a illustrates a flow diagram of operations 700 occurring in a UE as the UE determines a search space(s) to monitor in accordance with an indicator of a set of search space configurations. Operations 700 may be indicative of operations occurring in a UE, such as UEs 110-116, as the UE determines a search space(s) to monitor in accordance with an indicator indicating a search space configuration.

Operations 700 may begin with the UE determining a set of search space configurations to use (block 705). As discussed previously, the set of search space configurations may be specified by a technical standard, an operator of the communications system, and the like. In such a situation, the set of search space configurations may already be programmed in the UE. Alternatively, when the UE initially attaches to the communications system, the set of search space configurations may be provided to the UE. Alternatively, the eNB may transmit the set of search space configurations to the UE. The set of search space configurations may be periodically transmitted or when the set of search space configurations is modified.

The UE may receive information about a search space configuration selected for the UE (block 710). The information may include an indicator that indicates which search space configuration selected for the UE. In other words, the indicator indicates a search space configuration out of a set of candidate search space configurations that the UE is to monitor, with the search space configuration specifying which search space(s) out of a set of search spaces to be monitored. As an example, considering a situation where the set of search space configurations is as shown in Table 3, then the indicator may be a number with a value ranging from 0 to 2 indicating which search space configuration has been selected. The UE may receive the information in a broadcast message, a message specifically intended for the UE, a RRC message, a control channel, and the like. The UE may monitor the search space(s) corresponding to the search space configuration indicated (block 715). As an example, referring back to the set of search space configurations shown in Table 3, if the UE receives an indicator with value 1, the UE may then monitor the CSS for the PDCCH and the USS for the ePDCCH. The UE may receive control information on RBs, PRBs, CCE, eCCEs, and the like associated with the search space(s) monitored.

Figure 7B:
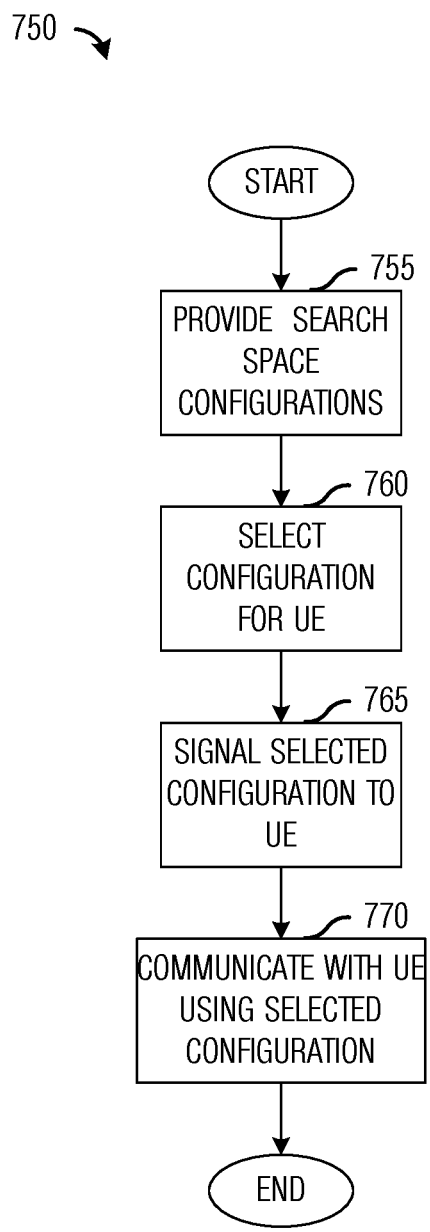
FIG. 7b illustrates an example flow diagram of operations occurring in an eNB as the eNB transmits to a UE that is monitoring a search space(s) from a set of search space configurations, the search space(s) selected for the UE by the eNB according to example embodiments described herein.

FIG. 7b illustrates a flow diagram of operations 750 occurring in an eNB as the eNB transmits to a UE that is monitoring a search space(s) from a set of search space configurations, the search space(s) selected for the UE by the eNB. Operations 750 may be indicative of operations occurring in an eNB, such as eNB 105, as the eNB transmits to a UE that is monitoring a search space(s) selected for it by the eNB out of a set of search space configurations.

Operations 750 may begin with the eNB providing the UE with the set of search space configuration (block 755). The eNB may transmit the set of search space configurations to the UE, at initial attachment or at handover, for example. It is noted that the set of search space configurations may also be referred to as a set of candidate search space configurations. The eNB may select a search space configuration for the UE from the set of search space configurations (block 760). In other words, the search space configuration is selected out of a set of candidate search space configurations that the UE is to monitor, with the search space configuration specifying which search space(s) to be monitored out of a set of search spaces. It is further noted that at least one of the search spaces in the set of search spaces is located in the data region. As an example, the set of search spaces may include one or more USS and one or more CSS. The eNB may randomly select the search space configuration to evenly distribute the utilization of the search space configurations. The eNB may select the search space configuration in accordance with selection factors including UE type, UE traffic type, UE subscription type, communications system conditions (e.g., system planning, interference management), and the like.

The eNB may send the selected search space configuration to the UE (block 765). The eNB may send the UE an indicator that indicates which search space configuration selected for the UE. The eNB may broadcast the indicator to the UE, send an RRC message (an example of a higher layer message) to the UE, use a control signal to send the indicator to the UE, and the like. The eNB may communicate with the UE using the selected search space configuration (block 770). As an example, the eNB may transmit control information to the UE. The control information may be carried on RBs, PRBs, CCEs, eCCEs, and the like, of a search space in the selected search space configuration.

It may be possible that the UE may not know which search space configuration to use before receiving information about the selected search space configuration from the eNB. In such a situation, some rules may be used by the UE to help avoid problems. As an example, before receiving the information, the UE may monitor the PDCCH search space, e.g., both the CSS and the USS of the PDCCH.

Similarly, in a situation when the UE sends a RACH message. Due to the limited nature of the RACH message, the eNB has limited information about the sender of the RACH message, i.e., the UE. The eNB may not know what search spaces and/or control channels the UE is capable of monitoring. The eNB may not even know if the UE is Rel-11 compliant. Several example solutions include:

1. The eNB may transmit the same message in several search spaces.

2. The RACH message may be expanded to include additional information: for instance, one bit may be added for UEs that are Rel-11 compliant. This bit could indicate whether to send the RACH response in the PDCCH CSS or ePDCCH CCS. In such a case, the eNB may rely on the techniques described in FIGS. 4a, 4b, 5a, 5b, 6a, and 6b and associated description thereof to determine whether to send the RACH response in the ePDCCH CSS. Since Rel-10 (or earlier) compliant UEs would not send this bit, the eNB would know that for Rel-10 (or earlier) UEs, it can only send the RACH response in the ePDCCH CSS. Alternatively, a new set of preamble sequences could be used for Rel-11 compliant UEs only, and using similar rules as in FIGS. 4a, 4b, 5a, 5b, 6a, and 6b, the eNB may determine where to send the RACH response.

In a situation where the UE is participating in MTC. On a wideband carrier, there might be UEs with different bandwidth capabilities coexisting. As an illustrative example, there might be a 20 MHz "regular" UE, and a 1.4 MHz "sensor" UE sharing the same carrier, and receiving data on the same carrier. Given that a sensor UE may use the ePDCCH, but may not monitor the entire 20 MHz, solutions include having the ePDCCH CSS include a subset of RBs. As an example, the ePDCCH CSS may include some or all of the six central RBs since any UE needs to be able to receive and decode the six central RBs in order to be able to obtain the synchronization channels that are sent on these six central RBs. If the ePDCCH CSS for MTC UEs comprise some or all of these six central RBs, the eNB may send information for the MTC UE on the six central RBs that are also part of the ePDCCH CSS.

It is noted that when the MTC UE initially sends a RACH message, the eNB needs to know that it is a MTC UE to know that is has to send the RACH response in a CSS that the MTC UE can monitor. An indication on the RACH message that the UE is a MTC UE (or more generally, lower bandwidth UE) may need to be included in the RACH message, either explicitly (by sending an additional bit, for example), or implicitly (depending on the preamble used, for example).

Regular UEs and MTC UEs may need to coexist on the same carrier. The CSS for the MTC UEs and the regular UEs may not overlap or may partially overlap. The CSS for MTC UEs may be small or restricted in bandwidth. The CCE definition and aggregation level definition may need to be compatible between the MTC UEs and regular UEs in order to have better packing efficiency. As an example, in a physical RB (PRB) the REs that are included in a CCE intended for use by a regular UE may be the same as a CCE intended for use by a MTC UE. The numbering of the CCE may also be the same for the CCE that are in overlapping resources. In general, the MTC UEs may have lower complexity and may not be capable of as many blind decodes as the regular UEs. The MTC UEs may also have different aggregation levels than the regular UEs.

Figure 8:
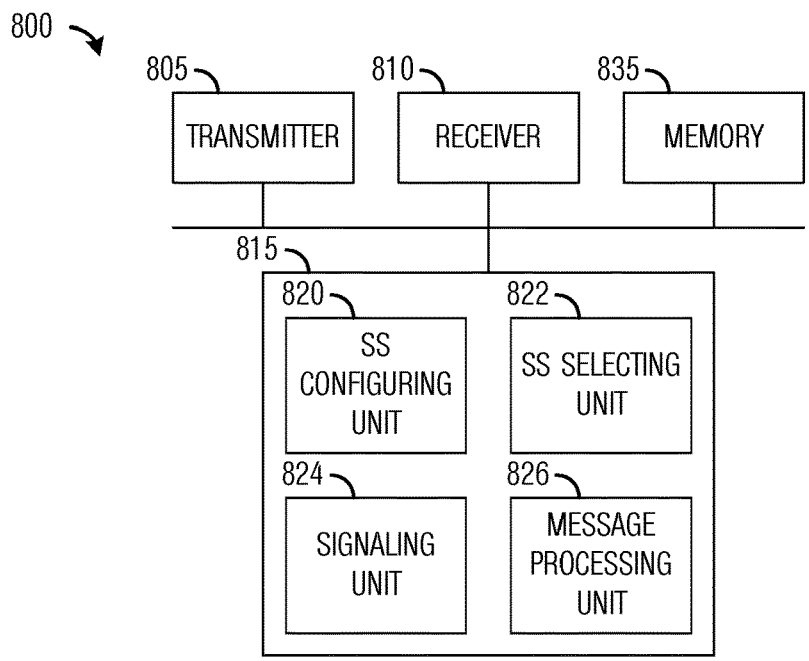
FIG. 8 illustrates an example first communications device according to example embodiments described herein.

FIG. 8 provides an illustration of a first communications device 800. Communications device 800 may be an implementation of a communications controller, such as an eNB, a BTS, a controller, a base station, an NB, and the like. Communications device 800 may be used to implement various ones of the embodiments discussed herein. As shown in FIG. 8, a transmitter 805 is configured to send packets and/or signals and a receiver 810 is configured to receive packets and/or signals. Transmitter 805 and receiver 810 may have a wireless interface, a wireline interface, or a combination thereof.

A search space (SS) configuring unit 820 is configured to specify search space configurations. SS configuring unit 820 may specify search space configurations from combinations of one or more search spaces. The search space configurations from SS configuring unit 820 may be used to generate a set of search space configurations. A SS selecting unit 822 is configured to select a search space configuration for a UE from the set of search space configurations. SS selecting unit 822 may select the search space configuration in accordance with selection factors including search space utilization, UE type, UE traffic type, UE subscription type, communications system condition, and the like. A signaling unit 824 is configured to signal information, such as control information, to a UE. A message processing unit 826 is configured to process messages received by communications device 800. Message processing unit 826 is configured to determine RACH preambles, indicators, requests, and the like, from received messages. A memory 835 is configured to store the set of search space configurations, selected search space configurations, historical information, network condition, UE information, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, transmitter 805 and receiver 810 may be implemented as a specific hardware block, while SS configuring unit 820, SS selecting unit 822, signaling unit 824, and message processing unit 826 may be software modules executing in a processor 815, a microprocessor, a custom circuit, or a custom compiled logic array of a field programmable logic array. SS configuring unit 820, SS selecting unit 822, signaling unit 824, and message processing unit 826 may be stored as modules in memory 835.

Figure 9:
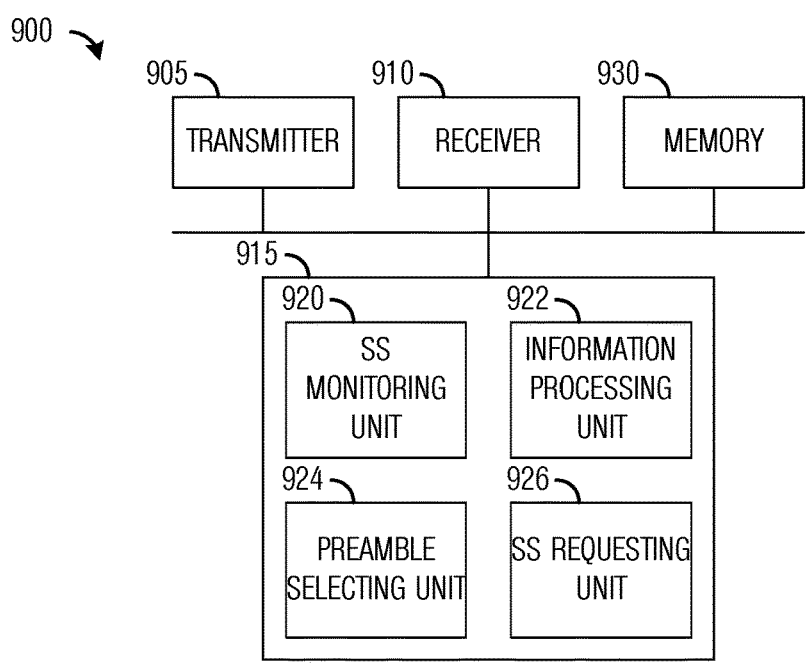
FIG. 9 illustrates an example second communications device according to example embodiments described herein.

FIG. 9 provides an illustration of a second communications device 900. Communications device 900 may be an implementation of a UE, a mobile station, a terminal, a user, a subscriber, and the like. Communications device 900 may be used to implement various ones of the embodiments discussed herein. As shown in FIG. 9, a transmitter 905 is configured to send packets and/or signals and a receiver 910 is configured to receive packets and/or signals. Transmitter 905 and receiver 910 may have a wireless interface, a wireline interface, or a combination thereof.

A SS monitoring unit 920 is configured to monitor search spaces for control channels, such as PDCCH, ePDCCH, PHICH, PCFICH, and the like, intended for communications device 900. SS monitoring unit 920 is configured to perform blind decodes on RBs of the search spaces it is monitoring. An information processing unit 922 is configured to process received information. Information processing unit 922 is configured to process received indicators, control channels, and the like. A preamble selecting unit 924 is configured to select a preamble, for a RACH message, for example. Preamble selecting unit 924 is configured to select a preamble to evenly distribute utilization of search spaces, for example. Preamble selecting unit 924 is configured to select a preamble to meet other selection criterion, such as network condition, historical performance information, and the like. A SS requesting unit 926 is configured to generate a request message for a search space. SS requesting unit 926 is configured to generate the request message that is transmitted to the eNB to obtain a USS for communications device 900. A memory 930 is configured to store the set of search space configurations, selected search space configurations, historical information, network condition, UE information, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, transmitter 905 and receiver 910 may be implemented as a specific hardware block, while SS monitoring unit 920, information processing unit 922, preamble selecting unit 924, and SS requesting unit 926 may be software modules executing in a processor 915, a microprocessor, a custom circuit, or a custom compiled logic array of a field programmable logic array. SS monitoring unit 920, information processing unit 922, preamble selecting unit 924, and SS requesting unit 926 may be stored as modules in memory 930.

Although the present disclosure and its advantages have been described in detail, it should be understood that various changes, substitutions and alterations can be made herein without departing from the spirit and scope of the disclosure as defined by the appended claims.

What is claimed is:

1. A method, comprising:
   monitoring, by a user equipment (UE), a first search space;
   receiving, by the UE, configuration information, the configuration information indicating a random access channel (RACH) configuration, the RACH configuration including a first set of preambles and a second set of preambles, wherein the first set of preambles corresponds to the first search space, and the second set of preambles corresponds to a second search space;
   transmitting, by the UE, a RACH message in accordance with a preamble from the second set of preambles based on a capability of the UE; and
   monitoring, by the UE, the second search space after the transmitting the RACH message based on the capability of the UE.

2. The method of claim 1, wherein the second search space is a common search space, the monitoring the second search space comprising:
   monitoring, by the UE, the second search space to receive a second physical downlink control channel (PDCCH) carrying an allocation of a shared channel for a reply to the RACH message.

3. The method of claim 1, wherein the configuration information is broadcasted.

4. The method of claim 1, wherein the first search space is a common search space.

5. The method of claim 1, wherein the RACH message indicates the UE having the capability.

6. The method of claim 1, the monitoring the first search space comprising:
   monitoring, by the UE, the first search space to receive a first physical downlink control channel (PDCCH) carrying scheduling information, the receiving comprising:
   receiving, by the UE, the configuration information based on the scheduling information.

7. A method, comprising:
   transmitting, by a base station, a first search space;
   transmitting, by the base station, configuration information, the configuration information indicating a random access channel (RACH) configuration, the RACH configuration including a first set of preambles and a second set of preambles, wherein the first set of preambles corresponds to the first search space, and the second set of preambles corresponds to a second search space;
   receiving, by the base station from a user equipment (UE), a RACH message;
   determining, by the base station, a capability of the UE based on the RACH message; and
   communicating, by the base station with the UE, in the second search space based on the determining the capability of the UE.

8. The method of claim 7, wherein the second search space is a common search space, the method further comprising:
   transmitting, by the base station, in the second search space a second physical downlink control channel (PDCCH) carrying an allocation of a shared channel for a reply to the RACH message.

9. The method of claim 7, wherein the configuration information is broadcasted.

10. The method of claim 7, wherein the first search space is a common search space.

11. The method of claim 7, wherein the RACH message indicates the UE having the capability.

12. The method of claim 7, the transmitting the first search space comprising:
    transmitting, by the base station, in the first search space a first physical downlink control channel (PDCCH) carrying scheduling information, the transmitting the configuration information comprising:
    transmitting, by the base station, the configuration information based on the scheduling information.

13. A user equipment (UE), comprising:
    at least one processor; and
    a non-transitory computer readable storage medium storing programming, the programming including instructions that, when executed by the at least one processor, cause the UE to:
    monitor a first search space;
    receive configuration information, the configuration information indicating a random access channel (RACH) configuration, the RACH configuration including a first set of preambles and a second set of preambles, wherein the first set of preambles corresponds to the first search space, and the second set of preambles corresponds to a second search space;
    transmit a RACH message in accordance with a preamble from the second set of preambles based on a capability of the UE; and
    monitor the second search space after transmitting the RACH based on the capability of the UE.

14. The UE of claim 13, wherein the second search space is a common search space, the instructions to monitor the second search space comprising instructions to:
    monitor the second search space to receive a second physical downlink control channel (PDCCH) carrying an allocation of a shared channel for a reply to the RACH message.

15. The UE of claim 13, wherein the configuration information is broadcasted.

16. The UE of claim 13, wherein the first search space is a common search space.

17. The UE of claim 13, wherein the RACH message indicates the UE having the capability.

18. The UE of claim 13, the instructions to cause the UE to monitor the first search space comprising instructions to cause the UE to:
    monitor the first search space to receive a first physical downlink control channel (PDCCH) carrying scheduling information, the instructions to cause the UE to receive the configuration comprising instructions to cause the UE to:
    receive the configuration information based on the scheduling information.

19. A base station, comprising:
    at least one processor; and
    a non-transitory computer readable storage medium storing programming, the programming including instructions that, when executed by the at least one processor, cause the base station to:
    transmit in a first search space;

transmit configuration information, the configuration information indicating a random access channel (RACH) configuration, the RACH configuration including a first set of preambles and a second set of preambles, wherein the first set of preambles corresponds to the first search space, and the second set of preambles corresponds to a second search space;

receive, from a user equipment (UE), a RACH message;

determine a capability of the UE based on the RACH message; and communicate, with the UE, in the second search space based on determination of the capability of the UE.

20. The base station of claim 19, wherein the second search space is a common search space, the programming further including instructions that, when executed by the at least one processor, cause the base station to:

transmit in the second search space a second physical downlink control channel (PDCCH) carrying an allocation of a shared channel for a reply to the RACH message.

21. The base station of claim 19, wherein the configuration information is broadcasted.

22. The base station claim 19, wherein the first search space is a common search space.

23. The base station of claim 19, wherein the RACH message indicates the UE having the capability.

24. The base station of claim 19, the instructions to cause the base station to transmit the first search space comprising instructions to cause the base station to:

transmit in the first search space a first physical downlink control channel (PDCCH) carrying scheduling information, the instructions to cause the base station to transmit the configuration information comprising instructions to cause the base station to:

transmit the configuration information based on the scheduling information.

* * * * *

UNITED STATES PATENT AND TRADEMARK OFFICE
CERTIFICATE OF CORRECTION

PATENT NO. : 12,114,308 B2
APPLICATION NO. : 17/493634
DATED : October 8, 2024
INVENTOR(S) : Sartori et al.

Page 1 of 1

It is certified that error appears in the above-identified patent and that said Letters Patent is hereby corrected as shown below:

In the Claims

In Column 18, in Claim 19, Line 67, after "transmit" delete "in".

Signed and Sealed this
Twenty-sixth Day of November, 2024

Katherine Kelly Vidal
*Director of the United States Patent and Trademark Office*